US006654953B1

(12) United States Patent
Beaumont et al.

(10) Patent No.: US 6,654,953 B1
(45) Date of Patent: Nov. 25, 2003

(54) EXTENDING PROGRAM LANGUAGES WITH SOURCE-PROGRAM ATTRIBUTE TAGS

(75) Inventors: Christian Beaumont, Issaquah, WA (US); Jonathan Caves, Redmond, WA (US); Paul F. Ringseth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/169,383

(22) Filed: Oct. 9, 1998

(51) Int. Cl.[7] .................................................. G06F 9/45
(52) U.S. Cl. ...................... 717/158; 717/112; 717/117; 717/130; 717/131; 717/141; 717/142; 717/143; 717/159
(58) Field of Search ............................... 717/158–159, 717/130–131, 141–143, 112, 117

(56) References Cited

U.S. PATENT DOCUMENTS

| 5,142,681 | A | | 8/1992 | Driscoll et al. ............. 395/700 |
| 5,713,032 | A | | 1/1998 | Spencer ....................... 395/777 |
| 5,898,872 | A | * | 4/1999 | Richley .......................... 717/3 |
| 5,999,740 | A | * | 12/1999 | Rowley ........................ 717/11 |
| 6,021,275 | A | * | 2/2000 | Horwat ........................... 717/7 |
| 6,083,276 | A | * | 7/2000 | Davidson et al. .............. 717/1 |
| 6,378,126 | B2 | | 4/2002 | Tang ............................... 717/5 |

OTHER PUBLICATIONS

Anderson et al., "Chimera: Hypertext for Heterogeneous Software Environments", ACM, pp. 94–103, Sep. 1994.*
Creech et al, "Using Hypertext in Selecting Reusable Software Components", ACM, pp. 25–38, Dec. 1991.*
Ferrans et al., "HyperWeb: A Framework for Hypermedia-Based Environments", ACM, pp. 1–10, Dec. 1992.*
Horwitz et al., "Generating Editing Environments Based on Relations and Attributes", ACM, pp. 577–608, Oct. 1986.*

* cited by examiner

Primary Examiner—Gregory Morse
Assistant Examiner—Ted T. Vo
(74) Attorney, Agent, or Firm—Woodcock Washburn LLP

(57) ABSTRACT

Attribute tags embedded in the statements of a source program system extend a programming language. A compiler for the program includes an interface to detect the attribute tags and to call one of a number of attribute-provider programs external to the compiler. The provider programs modify the operation of the compiler, for example by injecting additional statements or other code into the program at one or more predetermined points remote from the attribute tag. The compiler interface lists the names of the attributes and locations of their associated provider programs.

73 Claims, 11 Drawing Sheets

FIG. 2A
PRIOR ART

```
210
211 —— class A: public CWindow
        {
212 ——      DECLARE_WINDOW_MESSAGE_MAP(A)
            void OnClick()
            {
201         //Function Code Here
            }
        };
        BEGIN_WINDOW_MESSAGE_MAP(A)
213 ——      ON_WINDOW_MESSAGE(WM_LBUTTONDOWN, OnClick)
        END_WINDOW_MESSAGE_MAP()
```

FIG. 2B

```
220
221 —— [window]
222 —— class A
        {
223 ——      [on_window_message_(WM_LBUTTONDOWN)]
            void OnClick()
            {
201         //Function Code Here
            }
        };
```

Copyright © Microsoft Corp. 1998

```
3001  [module]
3002  class CTextXModule
3003  class CTextXmodule : public COMModule /* [module] */
3004  {
3005  };
3006
3007  // [module]
3008  CTextXModule _COMModule;
3009
3010  HRESULT STDMETHODCALLTYPE DllGetClassObject (REFCLSID rclsid, REFIID rlid, void** ppv)
3011  {
3012      return _COMModule.GetClassObject (rclsid, rlid, ppv);
3013  }
3014  STDAPI DllRegisterServer (void)
3015  {
3016      return _COMModule.RegisterServer (TRUE);
3017  }
3018  STDAPI DllUnregisterServer (void)
3019  {
3020      return _COMModule.UnregisterServer (TRUE);
3021  }
3022  BOOL WINAPI DllMain (HINSTANCE, hInstance, DWORD dwReason, LPVOID)
3023  {
3024      if (dwReason == DLL_PROCESS_ATTACH)
3025      {
3026          Module.Init (NULL, hInstance, NULL);
3027          DisableThreadLibraryCalls(hInstance);
3028          return TRUE;
3029      }
3030  }
```

FIG. 3B

```
3031        return TRUE;
3032   }
3033   //END [module]
3034
3035   //COMmODULE _COMModule;
3036   #include "ressource.h"
3037
3038   [
3039        datasource = "Provider=MSDASQL;Data Source=OLE_DB_NWind_Jet",
3040        dbcommand = "Select * from Products"
3041   ]
3042   class Employee
3043   {
3044   public:
3045        [datafield(1)] long m_nID;
3046        [datafield(2l)] char m_szName[50];
3047
3048   // [datasource = "Provider=MSDASQL;Data Source=OLE_DB_NWind_Jet" ]
3049   HRESULT OpenDataSource ()
3050   {
3051        CdataSource db;
3052        HRESULT hr;
3053        hr = db.OpenFromInitializationString (L"Provider=MSDASQL;Data Source=OLE_DB_NWind_Jet");
3054        if (SUCCEEDED (hr))
3055             hr = m_session.Open (db);
3056        return hr;
3057   }
3058   CSession m_session;
3059   // END [ datasource = "Provider=MSDASQL;Data Source=OLE_DB_NWind_Jet" ]
3060
3061   // [ dbcommand = "Select * from Products" ]
3062   DEFINE_COMMAND (Employee, "Select * from Products")
3063   typedef Ccommand<CAccessor<Employee> > cmd;
```

FIG. 3C

```
3064    // END [ dbcommand = "Select * from Products"]
3065
3066    BEGIN_COLUMN_MAP (Employee)
3067        COLUMN_ENTRY (1, m_nID) // [datafield(1) ]
3068        COLUMN_ENTRY (2, m_szName) // [datafield(2) ]
3069    END_COLUMN_MAP ()
3070
3071    };
3072
3073    [
3074
3075                dialog(IDD_DIALOG1)
3076
3077    ]
3078    class Voodoo
3079    class Voodoo : public CDialogImpl1<Voodoo>
3080    {
3081    public:
3082        enum { IDD = 101 }; // [ dialog(IDD_DIALOG1) ]
3083
3084        [ command_handler(IDC_BUTTON1) ]
3085        LRESULT OnClick (WORD wNotifyCode, WORD wID, HWND hWndCtl, BOOL& bHandled)
3086        {
3087            Voodoo dlg;
3088            dlg.DoModal ( );
3089            return 0;
3090        }
3091        [ command_handler (IDOK), command_handler(IDCANCEL) ]
3092        LRESULT OnCloseDlg (WORD wNotifyCode, WORD wID HWND hWndCtl, BOOL& bHandled)
3093        {
3094            EndDialog(wID);
3095            return 0;
3096        }
```

FIG. 3D

```
3097        BEGIN_MSG_MAP(Voodoo)
3098            COMMAND_ID_HANDLER (1000, OnClick)      // [ command_handler (IDC_BUTTON1) ]
3099            COMMAND_ID_HANDLER (1, OnCloseDlg)      // [ command_handler (IDOK), command_handler
3100        (IDCANCEL) ]
3101            COMMAND_ID_HANDLER (2, OnCloseDlg)      // [ command_handler (IDOK), command_handler
3102        (IDCANCEL) ]
3103            END_MSG_MAP ()
3104        };
3105
3106
3107        CLSID CLSID_Viper = {0xA5C07FD1, 0xC0ED, 0x11D1, {0xAB, 0x8C, 0x0, 0x0, 0x0, 0x0, 0x0, 0x0} };
3108        [
3109            uuid = "A5C07FD1-C0ED-11d1-AB8C-000000000000",
3110            progid = "ABC.A.1",
3111            control
3112        ]
3113        class Viper
3114        class Viper   :       public CComCoClass<Viper, &CLSID_Viper>,
3115                              public CComObjectRootEx<CComSingleThreadModel>,
3116                              public CComControl<Viper>,
3117                              public IOleControlImpl<Viper>,
3118                              public IOleObjectImpl<Viper>,
3119                              public IOleInPlaceActiveObjectImpl<Viper>,
3120                              public IViewObjectExImpl<Viper>,
3121                              public IOleInPlaceObjectWindowlessImpl<Viper>
3122        {
3123        public:
3124            [ message_handler (WM_RBUTTONDOWN) ]
3125            LRESULT OnRightClick(UINT uMsg, WPARAM wParam, LPARAM lParam, BOOL& bHandled)
3126            {
3127                Voodoo dlg;
3128                CWindow (GetActiveWindow ()).MessageBox ("ZZZZZZZZZ");
3129
```

FIG. 3E

```
3130        dlg.DoModal ();
3131        return 0;
3132    }
3133    [message_handler(WM_LBUTTONDOWN)]
3134    LRESULT OnClick(UINT uMsg, WPARAM wParam, LPARAM lParam, BOOL& bHandled)
3135    {
3136        Employee ::cmd emp;
3137
3138        HRESULT hr = emp.OpenDataSource ();
3139        hr = emp.Open(emp.m_session);
3140        hr = emp.MoveNext ();
3141
3142        CWindow(GetActiveWindow()).MessageBox(emp.m_szName);
3143        return 0;
3144    }
3145    HRESULT OnDraw (ATL_DRAWINFO& di)
3146    {
3147        RECT& rc = * (RECT*)di.prcBounds;
3148
3149        SetTextAlign(di.hdcDraw, TA_CENTER|TA_BASELINE);
3150        LPCTSTR pszText = _T("VC COM 1.1 TestX Monday");
3151        TextOut(di.hdcDraw,
3152                (rc.left + rc.right) / 2,
3153                (rc.top + rc.bottom) / 2,
3154                pszText,
3155                lstrlen(pszText) );
3156
3157        return S_OK;
3158    }
3159    //[progid = "ABC.A.1"]
3160    static const TCHAR* GetProgID ()
3161    {
3162        return _T("ABC.A.1");
```

FIG. 3F

```
3163        }
3164        // END [ progid = "ABC.A.1"];
3165        // [ control ]
3166        virtual HWND CreateControlWindow (HWND hWndParent, RECT& rcPos)
3167        {
3168            return Create(hWndParent, rcPos, "www.microsoft.com", WS_CHILD | WS_VISIBLE);
3169        }
3170        // END [ control ]
3171        // [ uid = "A5C07FD1-C0ED-11d1-AB8C-000000000000" ]
3172        static CLSID const* GetCLSID( )
3173        {
3174            static const GUID clsid = {0xA5C07FD1, 0xC0ED, 0x11D1, {0xAB, 0x8C, 0x0, 0x0, 0x0, 0x0, 0x0, 0x0, } };
3175            return &clsid;
3176        }
3177        // END [ uid = "A5C07FD1-C0ED-11d1-AB8C-000000000000" ]
3178        // [ control ]
3179        BEGIN_COM_MAP(Viper)
3180        COM_INTERFACE_ENTRY(IViewObjectEx)
3181        COM_INTERFACE_ENTRY(IViewObject2)
3182        COM_INTERFACE_ENTRY(IViewObject)
3183        COM_INTERFACE_ENTRY(IOleInPlaceObjectWindowless)
3184        COM_INTERFACE_ENTRY(IOleInPlaceObject)
3185        COM_INTERFACE_ENTRY2(IOleWindow, IOleInPlaceObject)
3186        COM_INTERFACE_ENTRY(IOleInPlaceActiveObject)
3187        COM_INTERFACE_ENTRY(IOleControl)
3188        COM_INTERFACE_ENTRY(IOleObject)
3189        END_COM_MAP()
3190        static HRESULT WINAPI UpdateRegistry(BOOL bRegister)
3191        {
3192            return _Module.UpdateRegistryClass("GetCLSID( ), GetProgID( ), GetProgID( ), 0, 0, bRegister);
3193        }
3194        static COMClassFactoryRegistrar<Viper> objectInfo;
3195
```

FIG. 3G

```
3196   HRESULT _AtlFinalConstruct()
3197   {
3198       m_bWindowOnly = true;
3199       AtlAxWinInit();
3200       return S_OK;
3201   }
3202   // END [ control ]
3203
3204   BEGIN_MSG_MAP(Viper)
3205       MESSAGE_HANDLER(516, OnRightClick)    // [ message_handler (WM_RBUTTONDOWN) ]
3206       MESSAGE_HANDLER (513, OnClick) // [ message_handler (WM_LBUTTONDOWN) ]
3207   END_MSG_MAP()
3208
3209   };
3210
3211   // [ control ]
3212   COMClassFactoryRegistrar<Viper> Viper: :objectInfo;
3213   // END [ control ]
```

EXTENDING PROGRAM LANGUAGES WITH SOURCE-PROGRAM ATTRIBUTE TAGS

COPYRYGHT NOTICE PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1998, Microsoft Corporation, All Rights Reserved.

FIELD OF THE INVENTION

The present invention involves electronic data processing, and more specifically concerns extensions to programming languages for providing dynamic open-ended modification of a language compiler under the control of source code during compilation of a program.

BACKGROUND OF THE INVENTION

C++ and other general-purpose programming languages are commonly employed in writing low- to medium-level code for systems such as applications, operating systems, and utility programs. Many programmers rely heavily on libraries of classes specific to the domain of the particular program they are writing. A number of sources make these libraries available to developers. For example, Microsoft® Foundation Classes (MFC) is a library of C++ classes useful in developing applications for Microsoft Windows® Active Template Library (ATL) is a library of classes and templates useful in coding components according to the Component Object Model (COM).

Class libraries and similar tools help programmers in several ways. They provide a uniform model or framework for constructing a program. They hide a certain amount of complexity and detail behind simple, easy to use application program interfaces (APIs). For example, hosting an ActiveX control is a significant task for C++ programmers. Using the appropriate available classes reduces the total effort by allowing programmers to concentrate upon coding the actual functionality of the control.

Incorporating these tools into a program, however, requires additional code for fastening together the different classes or other functionalities and for integrating them into the overall program. This additional plumbing or glue code conforms to a general pattern that tends to be repeated many times in a single program. Because it resides in the source code of the program rather than in an external library, this verbose additional code adds complexity and reduces readability. Conventional approaches to hiding detail—macros, include statements, compiler directives, and so forth—have neither the power nor the flexibility to alleviate this problem to any significant degree.

A system of intentional programming, conceived by Charles Simonyi, provides an abstraction mechanism for hiding detail and for providing language features as independent components. This system, however, requires extensive modifications to presently available compilers, and is not dynamically reconfigurable for different applications. Another concept, aspect-oriented programming (AOP), uses self-contained subprograms to modify global properties of an application program. Producing programs in this paradigm requires an entirely new kind of compiler, called a "weaver."

Therefore, a need remains for hiding the complexity that is introduced by the very tools whose purpose is to reduce complexity in writing programs for particular contexts or domains, and to do so without extensive modifications to conventional compilers.

SUMMARY OF THE INVENTION

The present invention introduces the concept of attributes that can be attached to programming constructs in source-code for hiding the glue code or any other operations required to employ certain constructs within programs for a specific type of applications. The glue-code or operations may relate to code added to the program at any point, either before or after the attribute is encountered, to modifications of code written by the programmer, to the manner in which certain constructs operate, and to other aspects of the program.

The invention can also be thought of as an instrumentality for extending a programming language in a way that is both powerful and flexible. Extensions for particular purposes become add-in or plug-in modules, easily inserted and easily removed. Different add-ins can be used in sets to provide customized sublanguages for particular problem domains.

When a program is compiled, a simple internal interface added to an otherwise conventional compiler calls an external attribute provider or handler for each of the attribute tags embedded in the source code. The attribute provider can then operate upon any of the code in the program in the compiler to provide the required operations.

Operations upon the code include adding additional code (glue code) to the program, modifying code in the program, deleting code from the program, and changing the manner in which certain constructs function. Operations can also include adding new base classes and switching existing base classes, adding new class members, adding new methods to a class, adding methods or code to existing methods, and adding new entries to a COM map, a MSG map, or a COLUMN map. Many other operations are also possible. The effects of these new attributes can occur at points within the program removed from the point at which the attribute tags occur. For example, an attribute can inject additional code lines at any point in a program source file, whereas a conventional macro can only expand a line of code at the point where the macro statement occurs.

Beyond providing a simple mechanism for hiding details with minimal compiler modifications, the invention offers easy reconfigurability and modifiability for compilers. Because the attribute providers are external to the compiler, they can be changed and upgraded separately, without requiring a new release, or even a new build, of the entire compiler. Vendors can supply different groups of attribute compilers for different purposes, such as for writing Microsoft Active® controls. Third parties can employ the interface to supply specialized or improved attribute providers for compilers sold by other manufacturers.

BRIEF DESCRIPTION OF THE DRAWING

FIGS. 2A and 2B show respectively a short section of code written in a conventional manner and employing attributes according to the invention.

FIG. 3, comprising FIGS. 3A, 3B, 3C, 3D, 3E, 3F, and 3G, is a longer example of code using attributes of the invention.

DETAILED DESCRIPTION

The following detailed description of preferred embodiments refers to the accompanying drawings that form a part hereof, and shows by way of illustration specific embodiments of the present invention. These embodiments are described in sufficient detail to enable those skilled in the art to practice the invention. Structural, logical, and procedural modifications within the spirit and scope of the invention will occur to those in the art. The following description is therefore not to be taken in a limiting sense, and the scope of the inventions is defined only by the appended claims.

Examplary Operating Environment

Figure 1:
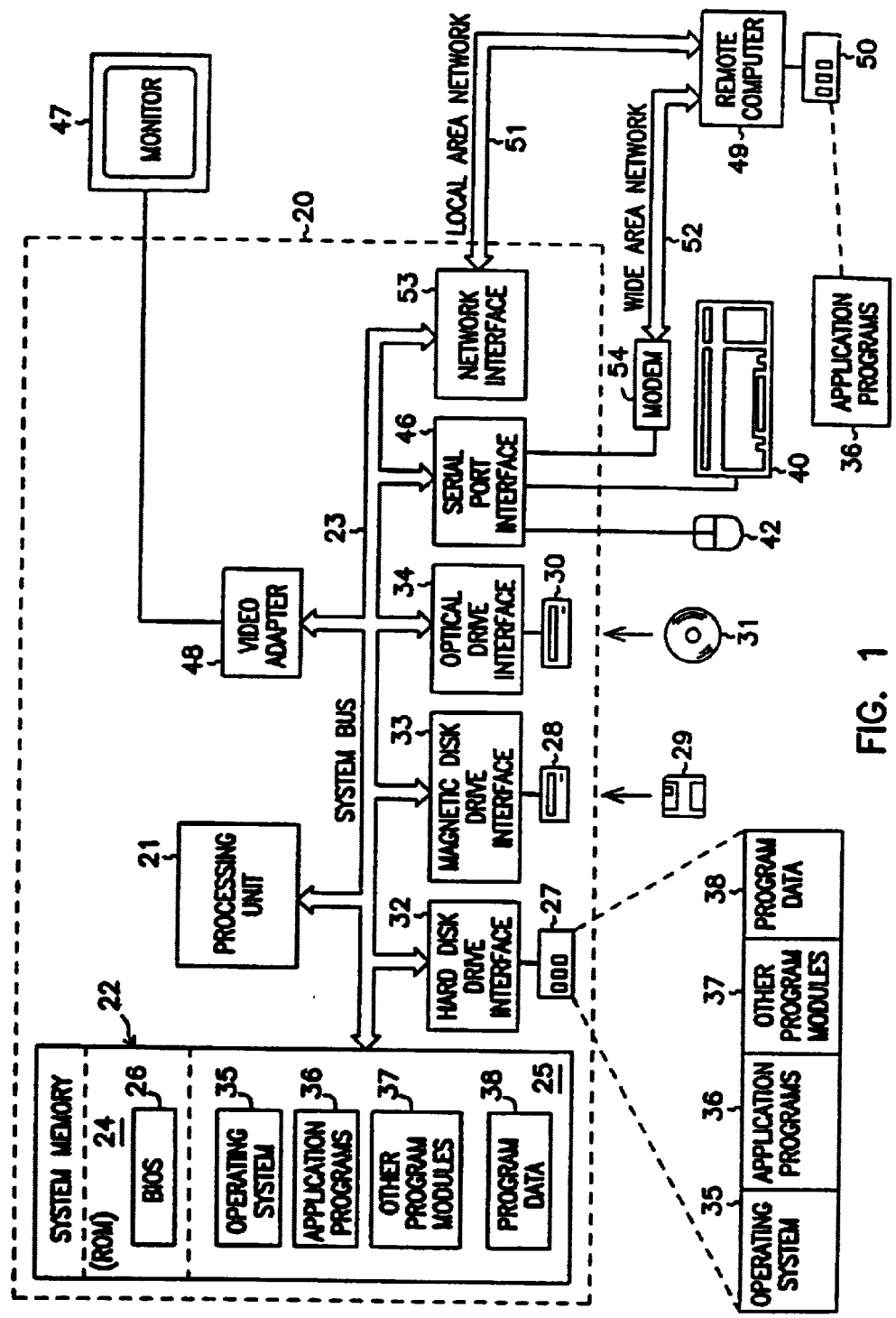
FIG. 1 is a block diagram of a typical environment for hosting the present invention.

FIG. 1 provides a brief, general description of a suitable computing environment in which the invention may be implemented. The invention will hereinafter be described in the general context of computer-executable instructions such as program modules, executed by a personal computer (PC); however, other environments are possible. Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows an exemplary system for implementing the invention. It employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted.

Language Attributes

FIG. 2A is a short segment 210 Of a source-code program written in C++. The overall purpose of segment 210 is to define a function OnClick 201 that determines what action to perform when a user presses a mouse button in the program. Function 201 is defined to operate in the context of the Microsoft® Windows® operating system. Statement 211 declares a class in the proper context, and statement 212 supplies detailed glue code that has to be manually added by the programmer in conventional practice. Lines 213 define a block containing further glue code for handling a Windows message for the function. The detailed code required to patch the desired function code 201 into the proper setting takes up a large fraction of the total segment.

FIG. 2B shows a corresponding source-code segment 220 employing attributes according to the invention. First an attribute tag 221 specifies that the following block takes place in the Windows context, so that line 222 can refer to the required class without any additional particularization. That is, the code in the segment can be written entirely as though it were being written within the restricted environment of a normal Windows OS program, without having to add or modify any code in the block because the actual environment differs. Another attribute tag 223 applies to function 201, so that the function code can be written in an environment that knows about the relevant messages for a mouse click, without having to supply those details in segment 220. Thus, apart from the attribute tags, the entire segment relates directly to implementing the functionality of the defined function, without any detailed glue code for particularizing the code to its context or environment.

In the short example of FIG. 2, the glue code of segment 210 only needed to be written once. In a longer program, conventional glue code would be included repeatedly, sometimes at a great distance from the functional code that it influenced; macros would not ameliorate this situation significantly, because a programmer would still have to find individually all the source-program locations requiring the extra code, and then include a separate macro statement at each location.

An attribute tag can be attached to any programming construct, including an entire block or program. The following table lists some representative forms.

| Construct | Sample |
|---|---|
| Program (anonymous) | [attr]; |
| Block | [attr]<br>{ <statements><br>} |
| Class declaration | [attr] class A |
| Function | [attr] void foo |
| Function argument | void foo ([attr] int n) |
| Variable | [attr] int n |

An example of attribute-tag syntax is shown below.
[
  attr1,
  attr2=val1,
  attr3(val2),
  attr4(prop1=val3, prop2=val4),
  attr5(val5,val6,prop3=val7,prop4={val8, val9})=
    {val10,val11}
]

Within the paired brackets denoting an attribute tag, a first attribute has only a name. A second attribute is set equal to a specific value. A third attribute has a value passed to it as a parameter; this is equivalent to the second form. Another attribute contains a list of properties set to specific values. The last attribute illustrates a parameter list containing values, properties set to individual values, and a property set to a list of values. Finally, a parameterized attribute itself is set to a list of values. Commas separate multiple attributes in a single tag.

FIG. 3 is a longer example 300 of C++ code written with attributes. This listing shows the original source code and bracketed attribute declarations in boldface. The lines in lighter type are "injected code" resulting from the attributes.

The injected code is normally located remotely from the point at which the attribute declaration appears in the source program. Code can be injected at multiple locations as well. Where the injected code is long or distant from the location of the attribute declarations in FIG. 3, it is surrounded by comment lines that identify the attribute for which it was injected. The scope of an attribute is not bound to the scope of its associated construct (variable, class, etc.); it can extend from the point of its use to the end of a compilation unit. As a practical matter, however, most attribute-provider writers and application-program programmers only deal with an attribute in the context of its associated variable or declaration. In FIG. 3, the module attribute in line 3001 operates over the entire program, the datafield(1) attribute in line 3045 is coextensive with the scope of variable m_nID, and command_handler(IDC_DIALOG1) in line 3083 operates over the block in lines 3079–3105.

Figure 4:
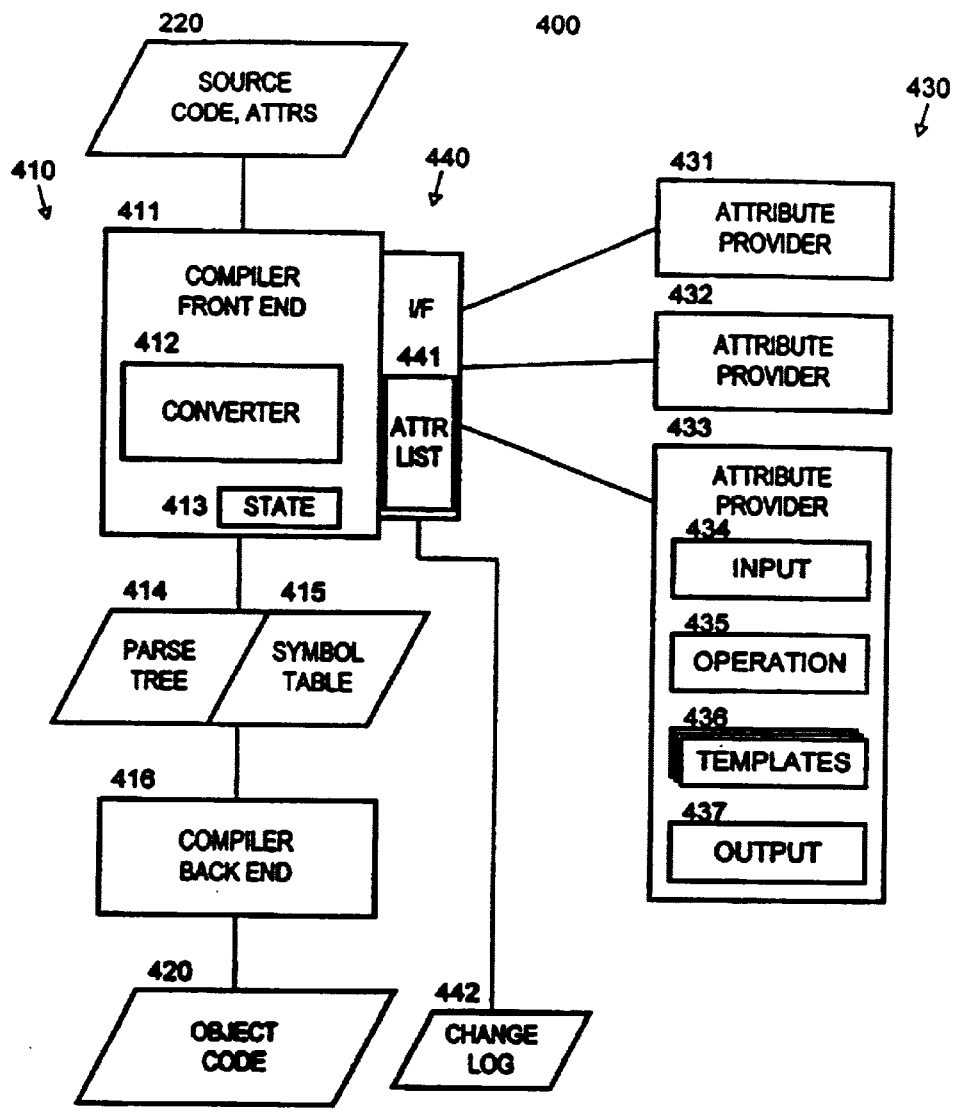
FIG. 4 is a block diagram showing the structure of a system for implementing the invention.

FIG. 4 is a block diagram of a system 400 for processing a source-code program, such as 220, having a sequence of statements with embedded attribute tags. Compiler 410 has an overall structure of a conventional type in which a front end 411 reads source program 220 written in a particular source language such as C++. Conventional block 412 converts the source program into a parse tree 414 in an intermediate or tokenized language. Basically, a compiler reads and translates a sequence of elements in the statements or commands of a source program. In program 220, for example, the compiler recognizes [window] as an attribute-tag element to be processed as a unit. The outer brackets {.} denote a block element. Within that element is a function-declaration language-construct element void OnClick( ), and so forth. A symbol table 415 lists all the symbol names used in the program, and their characteristics. Conventional states 413 keep track of where converter 412 is in the conversion of the program and the parse tree. For example, different states indicate that the compiler has seen an attribute, is at the start of a class definition or a function, has just declared a class member, or has completed an expression. As the compiler progresses, it continually updates its internal state 413. For the present purposes, a state can be considered to be any point at which the compiler is willing to accept external inputs; individual compilers might differ as to which states they are willing to expose to an outside program such as the present attribute providers.

Compiler back end 416 translates the intermediate program in 414 and 415 into an object-code program 420 by converting its tokenized code into instructions executable in a particular real or virtual processor, into memory allocations for variables, and so on. Front-end 411 and back-end 416 sections of modern compilers perform many additional functions, such as code optimization, that do not concern the present invention and can be implemented in any known manner. The purpose of two-stage compilers with separate front and back phases joined by a common intermediate language is to allow the marketing of compilers for M different source languages and N different processors by developing only M+N versions, rather than M·N different variations. The present invention can easily be implemented to a single-phase or other type of known compiler architecture.

A set of attribute providers 430 provide the functionality for processing source program 220 in accordance with the attribute tags. For example, attribute provider 431 can be an executable program performing operations associated with the [window] attribute 221. Providers 432 and 433 handle other attributes. Attribute providers 430 are completely external to compiler 410. They are stored separately in a memory such as RAM 22 or disk 32, FIG. 1. They can be added or deleted from system 400 separately from the compiler itself, and separately from each other. In fact, different providers or groups of providers can be sold or downloaded in order to supply different language extensions for different problem domains, such as writing ActiveX controls or COM+ objects. The providers themselves can take the form of dll or exe modules, and/or data or other files. In fact, if different compilers support the same interfaces, the same attribute provider can be used with multiple compilers, thus saving even more time and effort.

An individual provider such as 433 can be conceptually divided into several functional parts. An input module 434 receives a particular attribute from a tag and parses it for any parameters, values, properties, or other specifications. The compiler need not be written in any special way, as long as the compiler and attribute provider agree on the interface they will use to communicate. For instance, the compiler states that it will call methods M1, M2, and M3 and provide data in the form D1 and D2., while the attribute provider states that it will call methods M4 and M5, passing data in the form D3.

Operation module 435 determines which modifications must be made in order to implement the attribute in the source program, and identifies locations in the source program where code such as 213, FIG. 2A, is to be injected, or where other operations are to be carried out. Injected code usually comprises statements or other language elements added to the program at one or more locations. However, this term also includes existing source code that is changed or deleted, and other modifications. For example, attributes of COM+ or MIDL objects do not inject code, but rather effect the creation of meta-data that is not directly related to the compilation process. Injected code can be stored in the provider as templates 436 or in some other internal form. Output module 437 communicates the changes back to the compiler. There are many way that these changes can be actually effected in the application program. The attribute provider might write injected code to an external source file (not shown) that the compiler then consumes. The attribute provider might send the code directly to the compiler as a stream of bytes that the compiler processes. Another alternative is to have the attribute provider directly manipulate internal compiler structures, creating the necessary symbols, parse-trees, and other entities on the fly.

Interface 440 added to front end 411 ties attribute providers 330 into otherwise conventional compiler 310. As front end 411 encounters attribute tags in the input stream of source program 220, it changes its state designation 413 and saves the tags on an attribute list 441. This list also identifies the addresses or other locations of each attribute provider 431–433. In the environment of the Microsoft Windows95® operating system, the interface acquires the attribute-provider locations from the registry database. Interface 440 then continually communicates the compiler state 413 to all active providers 430. When any of them detects a point at which it desires to inject code or to perform any other operation, it signals converter 412 via interface 440. When a provider is called, it operates upon the application program in one of the ways mentioned above. Attribute providers 430 can effect their operations directly upon any file or structure in the compiler or outside of it. However, having an attribute provider instruct the compiler (e.g., converter 412) to perform the operations gives a measure of security; the compiler can reject or modify any request that would leave it in a bad internal state 413 or would otherwise compromise its proper functioning.

Interface 440 also produces a change log 442 containing a listing of all provider calls and arguments passed to the compiler. Internal compiler components 440 thus allow external attribute providers to reach into the internal states or structure of the compiler. An attribute in a source program can be analogized to a function whose arguments are the current and future states of the compiler. Furthermore, this approach far exceeds the functionality of a conventional preprocessor, which merely analyzes tokens without any knowledge of the higher structure of a program.

Figure 5:
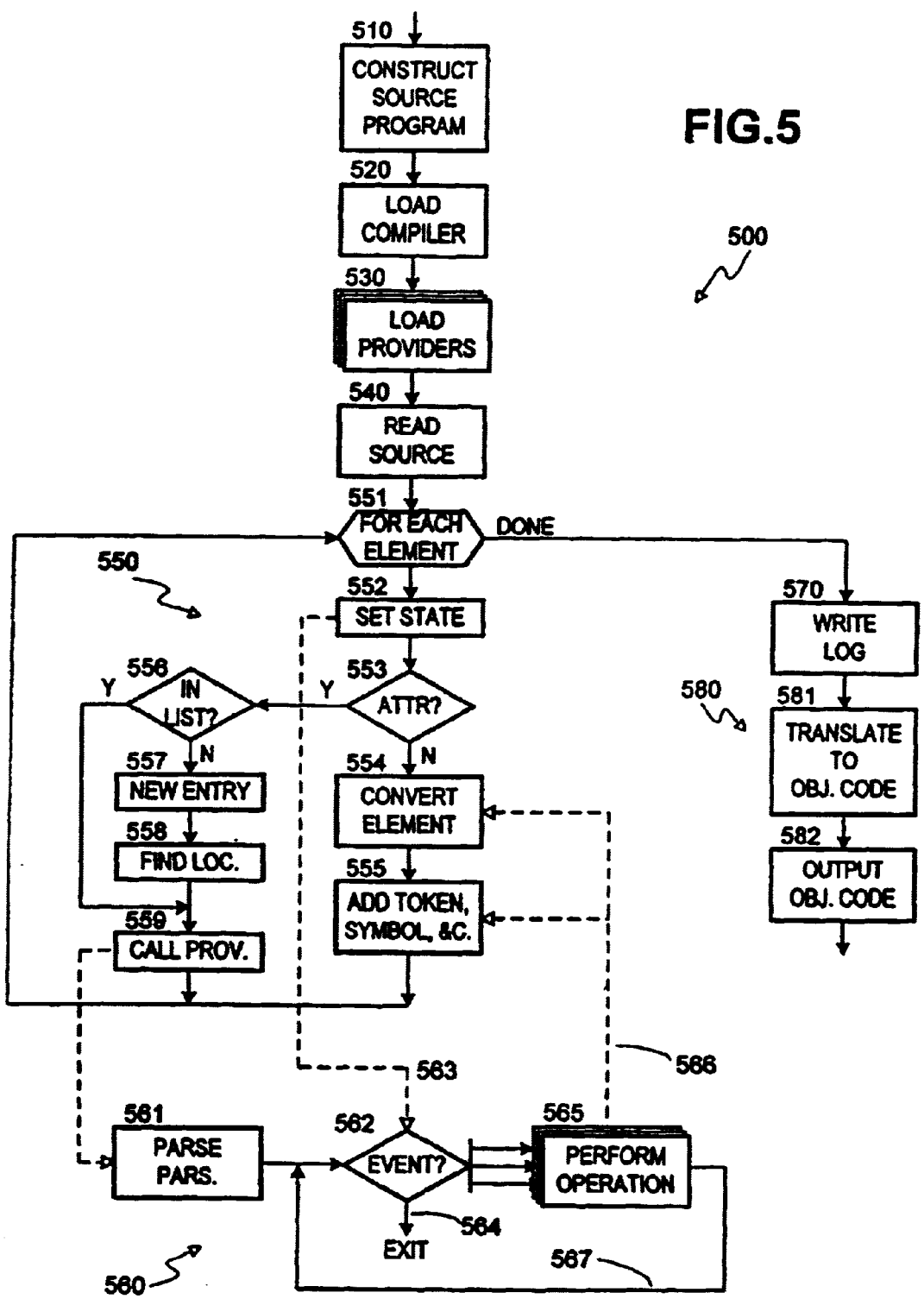
FIG. 5 is a flowchart showing a method for carrying out the invention.

FIG. 5 shows a method 500 for using attributes according to the invention. In block 510, a programmer constructs a source-code program 220 such as shown in the boldface lines of source listing 300, FIG. 3. The program is a sequence of statements having syntactic elements in a particular programming language such as C++, and also includes attribute tags as described above.

Block 520 loads a C++ compiler modified according to the invention. Blocks 530 separately load a number of attribute providers under the control of a user, another program, or in any other manner. It should be especially noted that the providers can be loaded at any time grelative to the loading of the compiler or of any other component. It is even possible for the compiler to call them from storage or from a remote server as the associated attribute tags are encountered in a source program. Blocks 530 can also register the attribute-provider program names and locations in a database such as the registry of the Microsoft Windows operating system. Block 540 reads the source program into the compiler front end 411, FIG. 4.

Blocks 550 convert or translate the statements of source program 220 in compiler 410. Block 551 detects each syntactic element of the source program. Block 552 sets an appropriate compiler state for that element. If block 553 determines that the current element is a conventional construct in the chosen language, then block 554 converts that element into a token in the intermediate language of the compiler. Block 555 places the token at an appropriate node of parse tree 412 if the element is to produce object-code instructions, or produces an entry in symbol table 413 if the element is declarative in nature. These and possibly additional functions represent conventional compiler operations.

However, if block 553 determines that the current element is an attribute having the syntax of an attribute tag, then block 556 asks whether that particular attribute name is already in attribute list 442, FIG. 4. If not, block 557 creates a new list entry for it, and block 558 finds the location or other identifier by which the external attribute-provider program can be accessed. Finally, block 559 calls the provider, transmitting any parameters or other data accompanying the name of the attribute in the tag construct. Control then returns to block 551 for processing the next syntactic element. The steps need not be carried out in any particular order. For instance, the compiler can find and list the tags during a conventional parse phase, and then process them during a later semantic-analysis phase.

Blocks 560 describe the action of an attribute provider called by block 559. If more than one attribute provider is active at any time during compilation, then a separate copy of blocks 560 executes concurrently for each one. Further, each provider is reentrant, because the same attribute can be called with different parameters, etc., within the same scope. Block 561 receives the attribute data from block 559, and parses any parameters or other data that affect the operation of the provider.

Block 562 detects the occurrence of designated events within compiler blocks 550. In this embodiment, the events are the states 413, FIG. 4, that are set in block 552. Dashed line 563 indicates this communication between compiler and providers. As mentioned above, a compiler writer can decide which internal states of the compiler to expose to the providers as "stable states" where the compiler is willing to accept inputs from the providers. Block 562 examines a currently active attribute and the current compiler state to determine whether to do nothing or to initiate a specific one of the operations 565. For example, while processing a class, the compiler encounters an attribute tag [foo] requiring the introduction of a global function. The appropriate attribute provider is made aware of this tag's occurrence, but the compiler is at that moment building a class definition. The provider therefore waits until the compiler reaches another state, indicating a global scope. At that later point, block 562 senses the appropriate state, and a block 565 requests the compiler to add the particular function. One of the events detected in block 562 can signify the end of an attribute scope in the source-code program. In that case, line 564 exits the provider program. A subsequent instance of the same attribute, of course, will reexecute the provider.

Multiple blocks 565 represent different operations that the attribute provider performs for different events that might occur within the compiler, and for different parameters transmitted with the attribute. Among these operations are injection of statements or other program elements, possibly employing templates such as 436, FIG. 4, and modifying or deleting code. Other operations include adding new classes, methods and variables, or modifying existing ones. Modification can include renaming and extending an object or construct. The only practical limitation on the form of operation concerns how much of its internal state the compiler can or desires to expose via interface 440, FIG. 4. That is, the compiler should still be able to protect itself against corruption by an attribute provider, and simplification of the interface might dictate omission of some capabilities. Dashed lines 566 represent the passing of code, state information, instructions, or other data back to the compiler for modifying the input program as described above. Control then returns on line 567 to block 562 for the detection of further events, until exit event 564 occurs.

When the source program 220 has been completely converted, block 570 produces log 442 if desired. Blocks 580 complete the transformation of the tokenized intermediate form in blocks 412 and 413, FIG. 4, into object-code program 420. Block 581 signifies the conversion to machine-language instructions, memory allocations, and other data required for the target real or virtual processor. Block 582 outputs the object code in whatever form is desired, such as a binary file or a printed dump. Again, method 500 supposes a two-stage compiler, but any compiler architecture or organization can be employed instead.

Conclusion

The foregoing illustrates the structures and methods for practicing the invention in a form presently preferred by the inventors. Other embodiments also fall within the scope of the appended claims. In particular, conventional means other than those specifically shown can be employed, and the orders of operations can be carried out in different temporal sequences.

We claim as our invention:

1. A system for extending a programming language, comprising:
   a source program including at least one syntactically identifiable attribute tag embedded in a sequence of source-language statements;
   a compiler for converting the source-language program into a different form, and, in response to encountering the attribute tag in the source program during conversion of the source program to the different form, for calling
   an attribute provider external to the compiler and associated with the attribute tag for modifying the operation of the compiler at a point in the source program remote from the point at which the attribute tag is embedded.

2. The system of claim 1 where the source program includes a plurality of attribute tags, and further comprising a plurality of attribute providers each associated with a different one of the attribute tags.

3. The system of claim 1 wherein modifying the operation of the compiler comprises injecting additional code into the source program.

4. The system of claim 1 further comprising a memory for storing the source program, the compiler, and the attribute provider.

5. The system of claim 4 further comprising a processor for executing the compiler and the attribute provider.

6. The system of claim 5 further comprising input/output devices for the source program and for the other form.

7. A system for extending a programming language in a customizable manner, comprising:
   a compiler for receiving a source-language input program including a plurality of statements and a plurality of different embedded attribute tags syntactically identifiable from the statements, and for converting the input program to a different form;
   a plurality of attribute providers external to the compiler and to each other, and respectively associated with different ones of the tags for modifying the input program during conversion to the other form,
   the compiler calling one of the attribute providers when encountering its associated attribute tag in the input program for performing an operation in respect of the program while converting the source program to the different form.

8. The system of claim 7 where each of the attribute providers is installable in the system independently of the others.

9. The system of claim 7 where the compiler comprises:
   a list of the attribute tags;
   a list of identifiers for locating respective ones of the attribute providers in the list of tags.

10. The system of claim 7 where the different form of the input is a parse tree.

11. The system of claim 10 where the compiler includes a back end for producing object code from the parse tree.

12. The system of claim 7 where the input program is modified in the compiler.

13. The system of claim 7 further including a log for recording modifications made to the input program by the attribute providers.

14. A compiler for extending a programming language, comprising:
   a front end for receiving a source program having statements in the language and also having a plurality of attribute tags syntactically identifiable from the statements embedded in the statements;
   an interface for calling a plurality of attribute providers external to the compiler in response to respective ones of the tags and for receiving outputs from the attribute providers;
   a converter for performing operations upon the program in response to the outputs from the attribute providers while converting the program to a different form.

15. The system of claim 14 further comprising a list of the attribute tags and a list of identifiers for calling respective ones of the providers.

16. The system of claim 14 where the converter adds injected code to the program.

17. An attribute provider for extending a programming language, comprising:
 an input module for receiving a call from an external compiler converting a source program in the programming language into a different form, when the compiler encounters a syntactically identifiable attribute tag in the source program while converting the source program to the different form;
 at least one operation module for performing an operation in response to the attribute tag;
 an output module for modifying the source program in accordance with the call, at a point remote from that at which the attribute tag occurs.

18. The provider of claim 17 where the input module receives at least one parameter with the call, and where the function module modifies its operation in response to the parameter.

19. The provider of claim 18 where the output module modifies the source program in response to the modified operation.

20. The provider of claim 17 where the output module injects additional code into the source program.

21. The provider of claim 20 where the additional code is injected at at least one location remote from the location of the attribute tag.

22. The provider of claim 20 where the additional code is injected in the compiler.

23. The provider of claim 20 where the attribute provider outputs at least one class definition to the compiler.

24. A computer-implemented method for constructing a computer program in an extensible programming language, comprising:
 writing the program as a sequence of source-code statements and attribute tags syntactically identifiable from the statements;
 compiling the program to a different form in a compiler;
 encountering one of the attribute tags at a certain location while compiling the program;
 selecting one of a plurality of independently replaceable attribute providers external to the compiler in response to the one attribute tag;
 modifying the program in the compiler by the attribute provider.

25. The method of claim 24 where modifying the program comprises injecting added code into the program as directed by the attribute provider.

26. The method of claim 25 where the injected code is added by the compiler.

27. The method of claim 25 where the injected code is added at a location in the program remote from the location of the one attribute tag.

28. A computer-readable medium containing instructions and data for carrying out the method of claim 24.

29. A computer-implemented method for constructing a program in an extensible programming language, comprising:
 receiving an input program having a sequence of statements and a plurality of different syntactically identifiable attribute tags;
 converting the input program to a different form in a compiler;
 while converting the program, encountering one of the different attribute tags;
 selecting one of a plurality of different and mutually independent attribute providers external to the compiler in response to which of the attribute tags was encountered;
 modifying the conversion of the input program by the selected attribute provider at a location remote from the location of the respective attribute tags.

30. The method of claim 29 where modifying the conversion of the input program comprises injecting additional statements to the input program.

31. The method of claim 30, where the additional statements are injected at multiple locations in the input program remote from the location of the one attribute tag.

32. The method of claim 30, where the additional statements are injected into the input program in the compiler, the additional statements being injected at a location in the input program remote from the location of the one attribute tag.

33. The method of claim 29 where selecting the one attribute provider comprises:
 matching the encountered tag with a list of available attribute tags;
 reading a location of the matched attribute tag;
 calling the attribute provider at the location.

34. A computer-readable medium containing instructions and data for carrying out the method of claim 29.

35. A method of constructing a source program, comprising:
 composing a sequence of statements in a predetermined source language;
 embedding in a plurality of the statements a plurality of different attribute tags syntactically identifiable from the statements for causing a compiler to inject additional statements into the program during compilation of the program to another form, the additional statements being at a location in the program remote from the location of the respective attribute tags.

36. The method of claim 35 wherein the additional statements for at least one of the attribute tags are injected at multiple noncontiguous locations in the source program.

37. The method of claim 35 where some of the statements having the embedded attribute tags are block statements.

38. The method of claim 35 where some of the statements having the embedded attribute tags are declaration statements.

39. The method of claim 38 where some of the declaration statements are function declarations.

40. The method of claim 38 where some of the declaration statements are variable declarations.

41. The method of claim 38 where some of the declaration statements are parameter declarations.

42. The method of claim 35 where some of the statements having the embedded attribute tags are function statements.

43. The method of claim 35 where some of the attribute tags include at least one parameter.

44. The method of claim 43 where some of the parameters are values.

45. The method of claim 43 where some of the parameters are properties.

46. The method of claim 35 where at least one of the attribute tags includes multiple parameters.

47. A computer-readable medium containing the source program of claim 35.

48. A computer-readable medium containing program instructions for carrying out a method for constructing a program in an extensible programming language, comprising:

receiving an input program having a sequence of statements and a plurality of different syntactically identifiable attribute tags;

converting the input program to a different form in a compiler;

while converting the program, encountering one of the different attribute tags;

selecting one of a plurality of different and mutually independent attribute providers external to the compiler in response to which of the attribute tags was encountered;

modifying the conversion of the input program by the selected attribute provider at a location remote from the location of the respective attribute tags.

49. The medium of claim 48 where the method further comprises constructing the input program including embedding the plurality of attribute taps.

50. An attribute provider adapted to cooperate with a compiler that receives source code including one or more attribute tags, wherein the compiler creates one or more internal data structures representative of the source code and creates executable code based on the internal data structures, and wherein the compiler includes logic which detects said attribute tags, the attribute provider comprising:

a first method exposed by the attribute provider to the compiler, wherein the compiler invokes said first method in response to detection of a first one of the attribute tags;

an input module which receives an attribute from said first one of said attribute tags when said first method is invoked, and which parses said attribute to derive one or more values from said attribute;

an operation module which determines an action to be taken based on said attribute; and an output module which communicates said action to the compiler.

51. The attribute provider of claim 50, wherein the compiler exposes a second method callable by the attribute provider, and wherein the attribute provider communicates with the compiler by calling said second method.

52. The attribute provider of claim 50, wherein said output module communicates said action to the compiler by sending a stream of bytes to the compiler, wherein the compiler modifies at least one of the internal data structures according to said stream of bytes.

53. The attribute provider of claim 50, wherein said output module communicates said action to the compiler by modifying at least one of the internal data structures.

54. The attribute provider of claim 50, wherein the attribute provider comprises a library of methods dynamically linkable to the compiler, said library including said first method.

55. The attribute provider of claim 50, wherein the compiler is adapted to be in one of at least two states, and wherein the attribute provider, before modifying said at least one of the internal data structures, waits for the compiler to leave a first of said at least two states when said first method is called and the compiler is in said first state.

56. A system for using a compiler to create executable code, wherein the compiler receives source code and creates executable code based on the source code, the system comprising:

a first attribute provider which includes a first method that modifies the source code, wherein said attribute provider exposes said first method such that said first method is callable by the compiler, wherein the source code includes one or more attribute tags prior to being received by the compiler, and wherein the compiler includes logic which detects said attribute tags and invokes said first method in response to detection of at least a first one of said attribute tags.

57. A method of supporting the use of attribute tags in a source program, the method comprising:

receiving, in an attribute provider, a first method call from a compiler which converts the source program to one or more internal data structures and uses said internal data structures to create executable code, said method call indicating the presence of a first one of the attribute tags in the source program; and in response to said first method call, modifying at least one of said internal data structures.

58. The method of claim 57, wherein said attribute provider comprises a library of methods dynamically linkable to said compiler, and wherein said library includes a method referenced by said first method call.

59. The method of claim 57, wherein said modifying act is performed by said attribute provider.

60. The method of claim 57, wherein said modifying act comprises:

said attribute provider communicating a stream of bytes to said compiler indicative of a modification to be made, whereby said compiler alters said at least one of said internal data structures in accordance with said stream.

61. The method of claim 57, further comprising:

said attribute provider communicating information to said compiler by calling a second method exposed by said compiler.

62. A computer-readable medium having computer-executable instructions adapted to cooperate with a compiler that converts the source program to one or more internal data structures and uses said internal data structures to create executable code, the computer-executable instructions being adapted to perform a method comprising the acts of:

receiving a first method call from the compiler, said method call indicating the presence of a first one of the attribute tags in the source program; and in response to said first method call, modifying at least one of said internal data structures.

63. A method of compilation that supports the use of attribute tags in a source program written in a programming language, the method comprising:

in a compiler, performing a lexical analysis of the source program;

during said lexical analysis, detecting the presence of a first one of the attribute tags in the source program, said first attribute tag not being part of the programming language; and in response to said detecting act, calling a first method on a first attribute provider which is external to said compiler and communicatively coupled to said compiler.

64. The method of claim 63, further comprising:

determining, based on which of the attribute tags is detected, whether to call said first method on said first attribute provider or on a second attribute provider different from said first attribute provider, said second attribute provider being external to said compiler and communicatively coupled to said compiler.

65. The method of claim 63, wherein said first attribute provider comprises a library of methods dynamically linkable to said compiler, wherein said library includes said first method.

66. The method of claim 63, further comprising the act of said compiler exposing a second method to said first attribute provider, whereby said first attribute provider communicates with said compiler by calling said second method.

67. A method of supporting the extensibility of a pre-defined programming language, the programming language including a plurality of lexical tokens, the method comprising:

providing a compiler which:
(a) recognizes the lexical tokens;
(b) recognizes an attribute tag which is not one of the lexical tokens;
(c) calls a first method external to said compiler in response to recognition of said attribute tag; and
(d) converts source code written in the programming language into one or more internal data structures conforming to a pre-defined format;

publicizing an interface to said compiler, said interface including (a) a profile of said first method and (b) said pre-defined format; and exposing said internal data structures whereby said internal data structures are manipulable by said first method.

68. The method of claim 67, wherein said compiler further:
(e) creates executable code based on said one or more internal data structures.

69. The method of claim 67, wherein said compiler exposes a second method callable by an object external to said compiler, whereby said object communicates information to said compiler by calling said second method.

70. The method of claim 67, further comprising:
providing an attribute provider which implements said first method and which modifies at least one of said internal data structures when said first method is called.

71. The method of claim 70, wherein said attribute provider comprises a library of methods dynamically linkable to said compiler.

72. A computer-readable medium which stores components comprising:

a compiler that:
receives source code having one or more attribute tags;
creates one or more internal data structures based on the source code;
creates executable code based on said one or more internal data structures;
detects the presence of at least a first one of said attribute tags; and
invokes a method in response to detection of said first attribute tag; and an attribute provider that:
receives a call to said method; and
in response to the call to said method, modifies at least a first one of said internal data structures.

73. The computer-readable medium of claim 72, wherein said attribute provider further:
determines to modify said first one of said internal data structures based on which of said attribute tags is detected by the compiler.

* * * * *